Patented May 1, 1928.

1,668,172

UNITED STATES PATENT OFFICE.

MIKI SASAKAWA, OF YOKOHAMA, JAPAN.

PLASTIC COMPOSITION FOR MODELING.

No Drawing. Application filed April 28, 1925, Serial No. 26,529, and in Japan June 3, 1924.

This invention relates to a substitute for clay for plastic works formed by kneading lime soap and vaseline or any other mineral grease, adding thereto fine powder of lime carbonate, or any other mineral, and flower of sulphur, and again kneading the mixture, and the object thereof is to obtain an excellent material for making models for sculptors or for manual-training of school boys, which material does not change its consistency according to the change of climate.

This invention is for an improvement in modeling clay for sculptors and for use in manual-training schools for children. The modeling clay hitherto used by sculptors is dark gray in colour and changes its consistency with changes in climate, becoming too soft when the temperature rises somewhat, and becoming too hard when the temperature falls. In addition this modeling clay soils the hands of the modeler and besides, is quite expensive. The modeling clay now used in the training of children requires kneading with water before it acquires the desired consistency, and soils the hands and clothing when in use. The use of such modeling clay for children, further, is prejudicial to the health as the clay becomes powdered when it dries and is likely to be blown about the room.

My invention obviates all these disadvantages, the modeling material being formed from kneading lime soap, a mineral grease such as vaseline, powdered carbonate of lime, talc or a similar mineral, and a small amount of sulphur.

In this invention the lime soap and mineral grease give to the body of the clay permanent plasticity and softness, and the sulphur assists in giving an agreeable feeling to the touch, and prevents the material from sticking to the hands. The product can be coloured as desired, is not affected by change of climate, does not become hard by drying, and has no offensive odour. It is therefore suitable for use in manual-training of school children or to be substituted for the clay of sculptors.

I am aware that there is a method of manufacturing modeling clay by heating a mixture of hydrated magnesia silicate, or hydrated alumina silicate, and olein, then adding thereto zinc oxide, and kneaded with an oil such as castor oil. But a combination of zinc, oleinate and oil is very adhesive, and such product has a tendency to soil the hands and clothing. Now in the present invention the product being produced by dissolving lime soap in a mineral oil and adding thereto powder of sulphur, is less adhesive and retains the property of being very soft. Thus not only the above drawbacks are removed, but the product being very compact, is agreeable to touch.

The following is an example of carrying my invention into effect:—

Take a solution of 10 parts of soap and add slowly thereto lime chloride until lime soap stops to precipitate. Then separate the precipitate, that is lime soap by decantation or filtration. Wash it with water and after drying pound the same to powder. Add to the powder an equal amount of a mineral grease such as vaseline, ozokerite or mineral jelly, and knead it with a roller. Then add 70 parts of lime carbonate, 20 parts of talc powder, and a small amount of flower of sulphur to 30 parts of the above mixture after adding thereto any desirable dye or pigment and making it like a soft fat, and after kneading the whole well, the product is obtained.

Claims—

1. A plastic molding composition, formed by adding powder of lime carbonate, and flower of sulphur to a soft fat like substance produced by kneading a mixture of lime soap and a mineral grease, and kneading the whole well for the purpose herein set forth.

2. A plastic molding composition, formed by kneading well a mixture of lime soap, vaseline, colouring matter, lime carbonate, talc and flower of sulphur for the purpose herein set forth.

In testimony whereof I have signed my name to this specification.

MIKI SASAKAWA.